(12) United States Patent
Kemp

(10) Patent No.: US 6,425,570 B1
(45) Date of Patent: Jul. 30, 2002

(54) BALL VALVE HAVING RETRACTABLE SEALING MEMBER

(75) Inventor: Willard E. Kemp, Houston, TX (US)

(73) Assignee: Kemp Development Corp., Houston, TX (US)

( * ) Notice: Subject to any disclaimer, the term of this patent is extended or adjusted under 35 U.S.C. 154(b) by 0 days.

(21) Appl. No.: 09/693,436

(22) Filed: Oct. 20, 2000

Related U.S. Application Data

(60) Provisional application No. 60/162,870, filed on Nov. 1, 1999.

(51) Int. Cl.[7] .................................................. F16K 25/00
(52) U.S. Cl. ...................... 251/159; 251/161; 251/172; 251/175; 251/192
(58) Field of Search ............................ 251/157, 158, 251/159, 160, 161, 162, 163, 172, 175, 180, 192, 214; 384/275, 291, 625

(56) References Cited

U.S. PATENT DOCUMENTS

| | | | | |
|---|---|---|---|---|
| 3,011,513 A | * | 12/1961 | Heinen | 137/246 |
| 3,463,448 A | * | 8/1969 | Piccardo | 137/268 |
| 3,617,025 A | * | 11/1971 | Gerbic et al. | 251/172 |
| 4,795,132 A | * | 1/1989 | Ells | 251/159 |
| 5,078,175 A | * | 1/1992 | Martin et al. | 137/242 |
| 5,718,516 A | * | 2/1998 | Cheever et al. | 384/100 |

OTHER PUBLICATIONS

Posi–Flate Butterfly Valves, St. Paul, MN, copyright 1993, Inflatable Seated Butterfly Valves, Series 435 and 436 for Dry SolidsProcessing, 4 pages.

* cited by examiner

*Primary Examiner*—William C. Doerrler
*Assistant Examiner*—Patrick Buechner
(74) *Attorney, Agent, or Firm*—Browning Bushman P.C.

(57) ABSTRACT

A ball valve having an upstream seat (92) with the seat actuated by outside pressure (14, 16). Retraction members (100, 102) continuously urge seat (92) to a retracted position out of sealing engagement with the ball. A sealing member (104) fits loosely within an annular recess in the seat (92).

7 Claims, 8 Drawing Sheets

BALL VALVE HAVING RETRACTABLE SEALING MEMBER

REFERENCE TO RELATED APPLICATION

This application claims the benefit of provisional Application Serial No. 60/162,870 filed Nov. 1, 1999.

FIELD OF THE INVENTION

This invention relates to valves for controlling the flow of fluid and more particularly to a valve in which a closure member rotates between opened and closed positions in which the sealing member between the valve body and closure member engage only upon the application of exterior pressure unrelated to the pressure within the valve.

BACKGROUND OF THE INVENTION

Valves having a spherically shaped closure member rotating between open and closed positions within the body of the valve are usually referred to as ball valves. The rotating closure, however, has little structural relationship to a ball, the only similarity being the spherical maximum surface of the closing member. It is sometimes referred to as a ball herein. Seats in the body engage this maximum spherical surface at two opposing surfaces when the valve is closed and at two opposing surfaces 90 degrees from the first said surfaces when the valve is open. A flow passage continues through the ball within the seat diameters when the valve is in the open position. In the closed position, the closure member usually is solid within the seat diameters.

Historically, floating ball valves have had one or more seats which constantly engage the outer surface of the ball. When the ball is in the closed position in a "floating ball" design, upstream forces force the ball against the downstream seat. The force on this seat is equal to the upstream pressure minus the downstream pressure times the area enclosed by the sealing surface.

In some ball valve designs, called "trunnion ball" valves, the ball is fixed in lateral position by two trunnions or bearings at the top and bottom of the ball. In this case, the upstream seat is activated by pressure and the maximum force acting against the ball is equal to the area between the outside of the seat and the sealing diameter of the seat. It can be seen that low pressure valves favor the floating ball design where the seat force is equal to the entire area inside the sealing diameter. However, high pressure valves favor the trunnion valve design where the seat force is limited to the area between the outer and inner diameters of the upstream seat. The torque necessary to turn a valve having trunnions is much less than that of the floating ball valve design because the radius of the bearings is quite small. On the floating ball valve design the turning torque is resisted by the seat surfaces acting on the exterior of the ball.

With the seats constantly engaged, some problems are encountered with both trunnion and floating style balls. The seats themselves are usually lower modulus materials or have a small enough cross section to have an effective lower modulus. These seats can be abraded as the ball surface rotates against them. Secondly, as the ball just begins to open, high pressure forces tear at the seat. This action is called wire drawing. Surface adhesions, grit sand and other foreign materials in the liquid can also abrade away the seat or get under the seat and prevent it from sealing properly.

Some valves also have to operate with pressure extremes ranging from very low pressures to very high pressures. The floating ball valve design favors low pressure operations because the area exposed to line pressure is much greater. However, if a large floating ball valve is exposed to very high pressures, the force necessary to turn the valve can be extremely burdensome and can tear away the seat material. On the other hand, a trunnion style valve operating at very low pressures can have insufficient seat force to create a seal under some conditions. To overcome this, trunnion valves usually have seat springs urging the seat against the ball which create a minimum force necessary to obtain the sealing relationship with the ball under most normal conditions even at very low or zero pressures.

SUMMARY OF THE INVENTION

In my new design, the seat force is totally independent of line pressure. The valve can be of either the trunnion style or a floating ball, but the pressure against the upstream seat is controlled by external pressure—the force on the seat can therefore be very high when desired to affect a tight seal but can be zero when it is desired to rotate the ball.

The seat springs are also reversed. Instead of forcing the seats against the sealing surface of the ball with a minimum selected force, the seat springs work in the opposite direction to retract the seat to maintain a minimum clearance when the ball is being rotated.

In a trunnion design the upstream seat force against the ball is reacted by the trunnions. In a floating ball design the upstream seat force is reacted to by the downstream seat. In either case, the seat is only actuated when the ball is in the static position, either opened or closed. In a floating ball design, it may be desirable to have a fixed seal on the downstream side so that "double block and bleed," that is, simultaneous upstream and downstream sealing, can be obtained. In a trunnion design it may be necessary in some cases to have both upstream and downstream seats activated separately by exterior forces.

In the proposed design, flush ports are provided at both sides of the valve. When the seats are engaged with the valve in the closed position, flush ports can be used to pass clean fluids through the valve, removing any material which may have caked up in the bore of the valve or around the sealing surfaces. With seats engaged and the valve in the open position, the flush ports can be used to clean the closure surface of the ball. The flush ports can also be used to measure the pressure within the valve body when the seats are in the actuated position. If this pressure is zero it is an indication the valve is sealing tightly and there is no leakage whatsoever around either upstream or downstream seat. Such a feature is offered in certain valves and is known as double block and bleed. By this it is meant that both upstream and downstream seats are sealing against external pressure. The interior of the valve can be bled to zero and the lack of any flow indicates that both seats are working.

Another improvement in this design lies within the sealing member itself. The seat, in effect, is an annular piston actuated by external pressure. The seal mechanism which engages the surface of the ball is a small rectangular cross section metal ring which juts out slightly ahead of the surface of the seat to engage the ball in a sealing relationship. The metal ring is constrained laterally but allowed to expand or deform vertically to make up for minor inconsistencies of the ball and to assure a good sealing surface. Around the seat between the sealing member and the seat itself is injected a low modulus elastomer material which serves to keep out any foreign material, but is not stiff enough to keep the seat from radially expanding. The modulus of elasticity of injected material is less than 1 million pounds per square inch per inch whereas the seat material is at least 14 million pounds per square inch per inch and usually as high as 29 million pounds per square inch per inch.

Another improvement incorporated into this valve is in the stem design. Two bearings are provided for the stem; one near the lower end and one near the upper end. Both bearings are made from exceptionally hard material and each has grooves cut therein to serve as a receptacle for any grit that might get into the stem area. The stem itself is hardened in the area where the bearings contact so that you have two hardened surfaces bearing against each other. The upper stem bearing serves to prevent any off center movement of the stem due to actuator or handle inputs. The lower stem bearing prevents any off center movement of the stem bearing due to high forces arising from the ball sticking.

The stem also has a dirt excluder seal at its lower end. This prevents grit and line debris from entering up the stem cavity and getting in the bearings. At its upper end, the stem is retained in position by a snap ring. This is to make sure that no one can over tighten or under tighten the stem nut normally provided. The snap ring is in a precise location to allow the stem slight clearance so that it rotates in the bearings freely.

Other features and advantages of the invention will be apparent from the following specification and drawings.

DETAILED DESCRIPTION OF PREFERRED EMBODIMENTS

Figure 1:
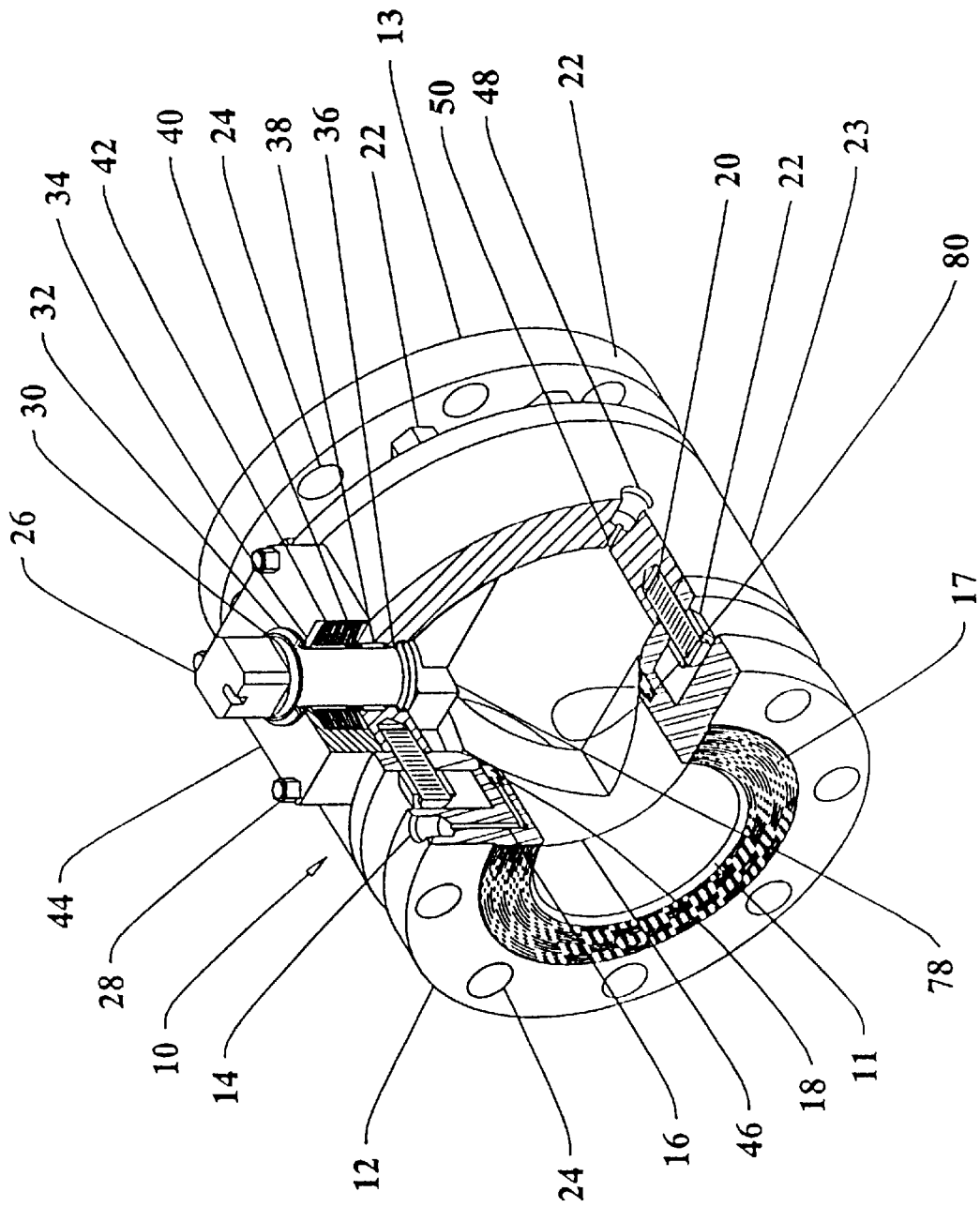
FIG. 1 is an isometric view of the ball valve of the present invention with certain portions cut away.

Referring now to FIG. 1, FIG. 1 is an isometric view of the valve (10) partially cut away to expose the inner workings. Valve (10) has a central body (23) and endpieces (12) and (13) connected to the central body by means of nuts (22) and studs (20) and sealed to the central body by gasket (21) not shown in this drawing but shown in FIG. 2. Through endpiece (12) is a port (14) leading to conduit (16) which is used to actuate seat (18) against the surface of ball (46).

Body (23) has conduit (11) extending therethrough. Ball (46) is shown in the closed position. It also has a conduit (47), which is rotated into a position so that the solid portions of ball (46) stop flow coming through conduit (11) by means of seat (18).

Grooved surface (17) is applied to each end of the valve to mate with a gasket installed in line flanges. Bolts (not shown) can be installed through holes (24) to fasten the valve securely in the line.

Valve central body (23) has a flush port (48) connecting with conduit (50) to allow fluids to be injected into the valve from the exterior to wash out the valve when seat (18) is firmly actuated. The valve body is equipped with stem (26), which is retained in place generally by bonnet (44) and capscrews (28). Stem (26) is equipped with lower bearing (36) and upper bearing (34). Packing (38) prevents any leakage upward between stem (26) and central body member (23). Follower (40) exerts pressure downward on the packing (38), said pressure coming from Belleville spring packs (42) which are trapped between the interior of bonnet (44) and the lip on follower (40). The stem (26) is retained on the upper side by bearing (32) and snap ring (30).

Figure 2:
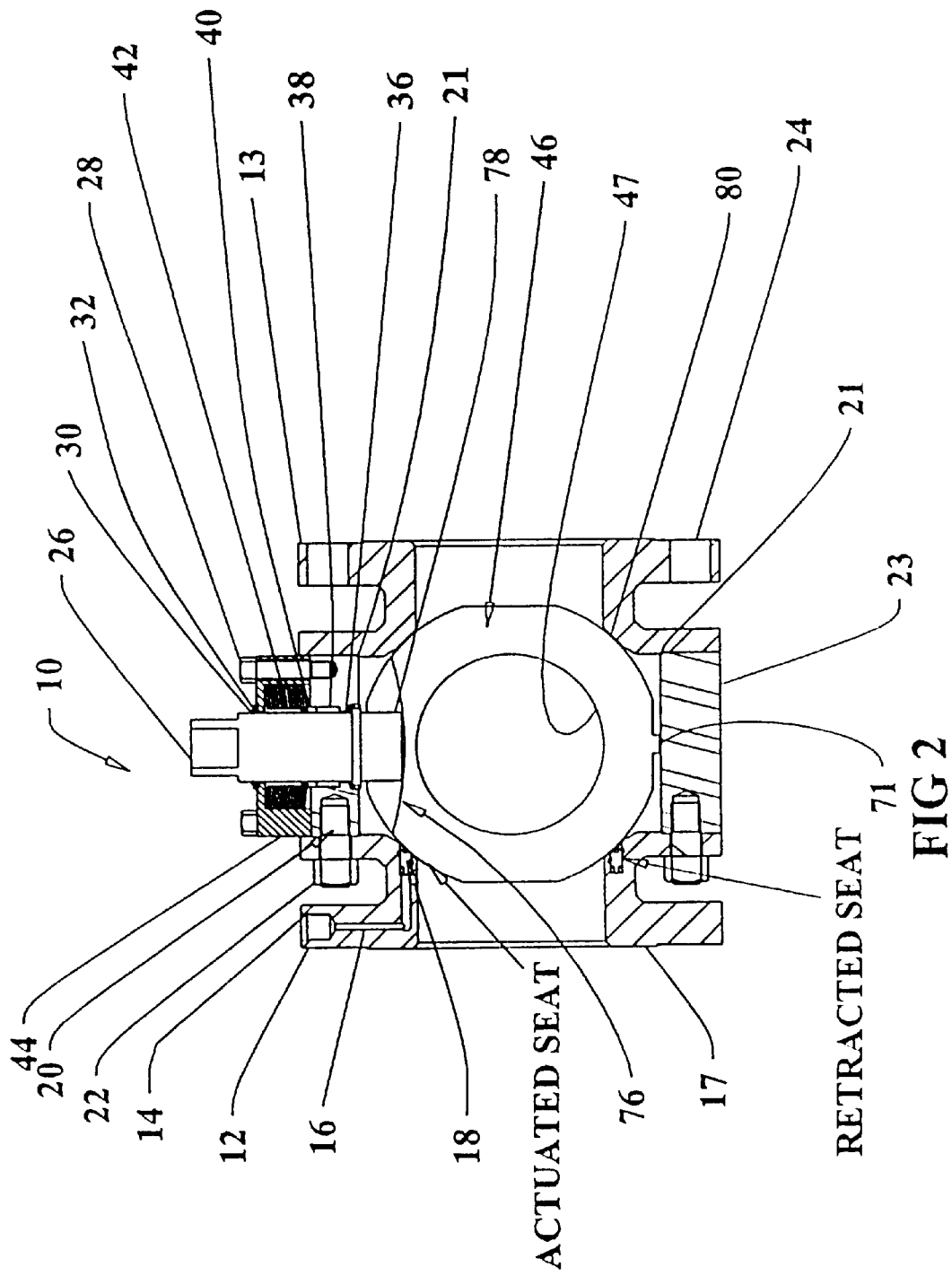
FIG. 2 is a cross sectional view of the ball valve shown in FIG. 1.

Referring now to FIG. 2, which is an orthographic cross section of valve (10). Ball (46) with center bore (47) is shown in the closed position. FIG. 2 shows one view of the seat in the actuated position and the other view of the same seat but in a retracted position. Seat (18) is tightly forced against ball (46) by pressure exerted through conduit (16) entering endpiece (12) through port (14). Pressure at port (14) passes through conduit (16) and pushes on the back of seat (18), pushing ball (46) tightly against surface (80) in endpiece (13).

Gaskets (21) seal endpieces (12 and 13) against central body (23) held in place by studs (20) and nuts (22). In FIG. 1, studs (20) and nuts (22) hold both endpieces (12) and (13) against central body (23). In FIG. 2, the nuts and studs holding endpiece (13) are rotated out of position and not shown for clarity. The grooved surfaces (17) as indicated in FIG. 1 serve as a place for gaskets to seal endpieces (13) and (12) tightly against mating flanges in the line, and held thereto by bolts passing through holes (24).

At (71) is shown a small section of ball (46), which fits loosely within central body (23). This section is reduced so that any trash at the bottom of valve (10) will constrain ball (46) from rotating only at its most central location.

Ball (46) has slot (76) fitting in close relationship to flattened portion (78) on stem (26). Rotary motion of stem (26) causes similar motion of ball (46) through the interaction of flattened portion (78) of stem (26) and slot (76) of ball (46). However, in the closed position of valve (10) as shown in FIGS. 1 and 2, ball (46) can move against endpiece (13)unimpeded by the flattened portion (78) of stem (26).

Figure 3:
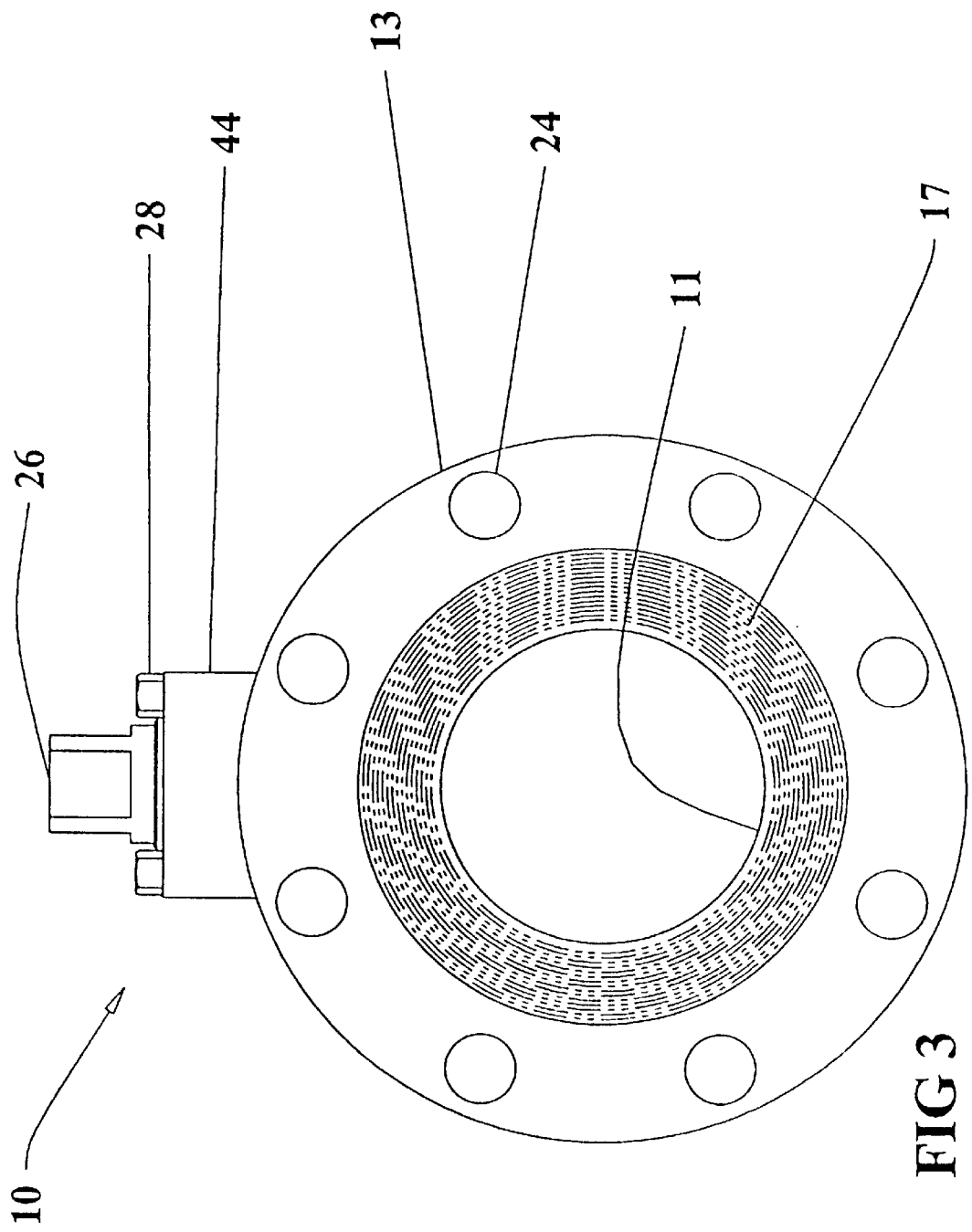
FIG. 3 is an end elevation view of the ball valve showing a mounting flange.

FIG. 3 is an end exterior view of valve (10). Shown are endpiece (13), bolt holes (24), grooved surfaces (17), conduit (11), bonnet section (44) held in place by capscrews (28), and stem (26).

Figure 4:
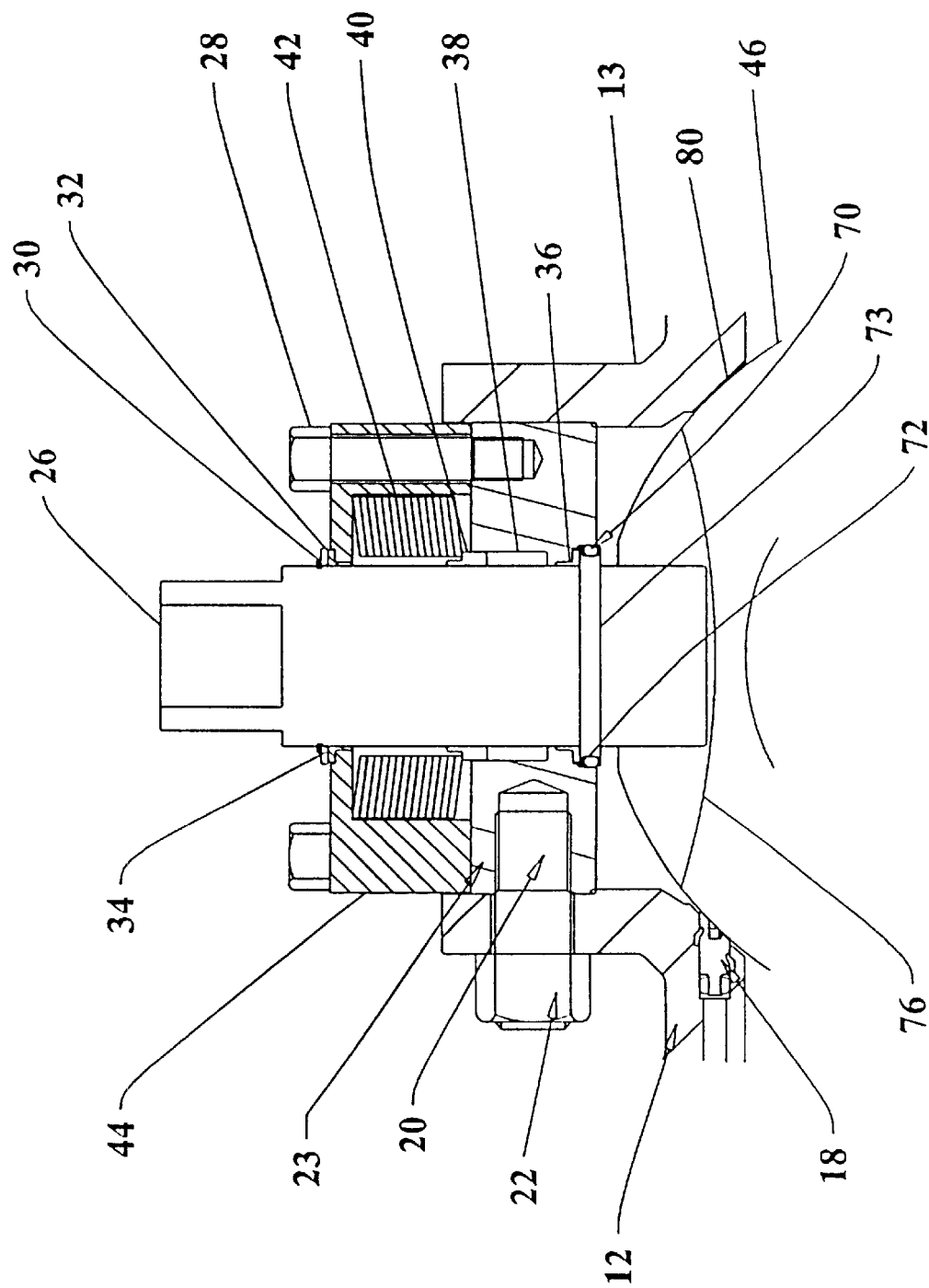
FIG. 4 is an enlarged sectional view of the bonnet of the valve member showing a stem mounted in the body for rotation of the ball.

FIG. 4 is a close up of the bonnet area of valve (10). Stem (26) is equipped with dirt exclusion seals (70) mounted in groove (72) on an expanded portion (73) of stem (26). Lower bearing (36) and upper bearing (34) serve to retain stem (26) between central body (23) and bonnet (44). Packing (38) assures sealing relationship between stem (26) and central body (23). Packing is forced down by follower (40), which is urged by the Belleville spring pack (42) trapped between the lip on follower (40) and interior of bonnet (44). Bearing (32) and snap ring (30) hold the stem (26) in fixed relationship to the valve allowing it to turn freely. Endpieces (12 and 13) are partially shown and studs

(20) with nuts (22) are shown holding endpiece (12) against central body (23). Similar studs and nuts hold endpiece (13) to central body (23) but they are not shown for clarity so as to allow full view of capscrew (28) which holds bonnet (44) down on central body (23).

Figure 5:
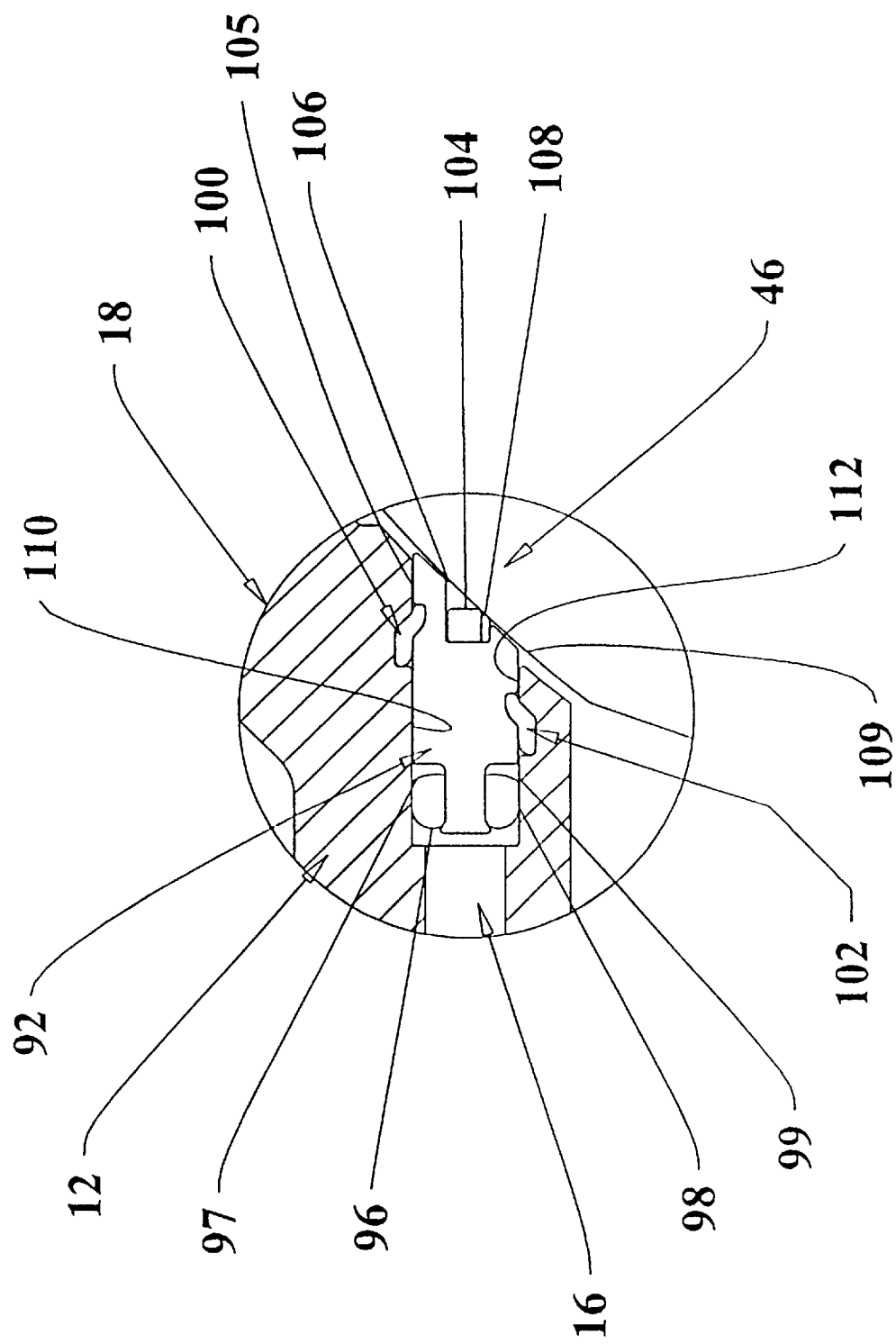
FIG. 5 is an enlarged sectional view of the annular seat in an actuated position in sealing engagement with the adjacent ball.

FIG. 5 shows an enlarged view of seat (18). A portion of endpiece (12) is shown into which an annular groove indicated by surfaces (112) and (110) has been machined into endpiece (12). Seat member (92) is machined to fit closely within the annular grooves determined by surfaces (100) and (112). Elastomeric seals (96) and (98) acting through shaped backup ring (97) and (99) allow seat member (92) to fit in sealing relationship in annular grooves formed by surfaces (110) and (112) machined into endpiece (12).

In FIG. 5 the seat is shown in the actuated position whereby hydraulic force applied through conduit (16) is pushing seat member (92) tightly to ball (46) at ball sealing surface (109). Retraction devices (100 and 102) are shown in the distended position. Retraction devices (100 and 102) include elastomeric retraction members mounted in opposed grooves along peripheral surfaces of seat (92) and the adjacent endpiece (12). Retraction devices are made from elastomeric material but they are not designed to seal. Seat member (92) is loosely recessed into endpiece (12). In the position shown, the retraction devices or members (100 and 102) are tending to push the seat member (92) away from the surface of ball (46) but have been overcome by pressure in conduit (16). The sealing member (104) is urged against ball sealing surface (109). Sealing member (104) fits loosely in recess (105) so that it may expand to conform to irregularities in ball sealing surface (109). Injected elastomeric materials (106) and (108) are placed around sealing member (104) to exclude dirt from this area and allow sealing member (104) to expand and contract uninhibited within recess (105). The modulus of elasticity of injected materials (106) and (108) is purposely selected to be less than one million pounds per square inch per inch whereas sealing member (104) has a modulus of at least 12 million pounds per square inch so that the contraction and expansion of sealing member (104) is uninhibited by the presence of the injected materials (106) and (108).

Figure 6:
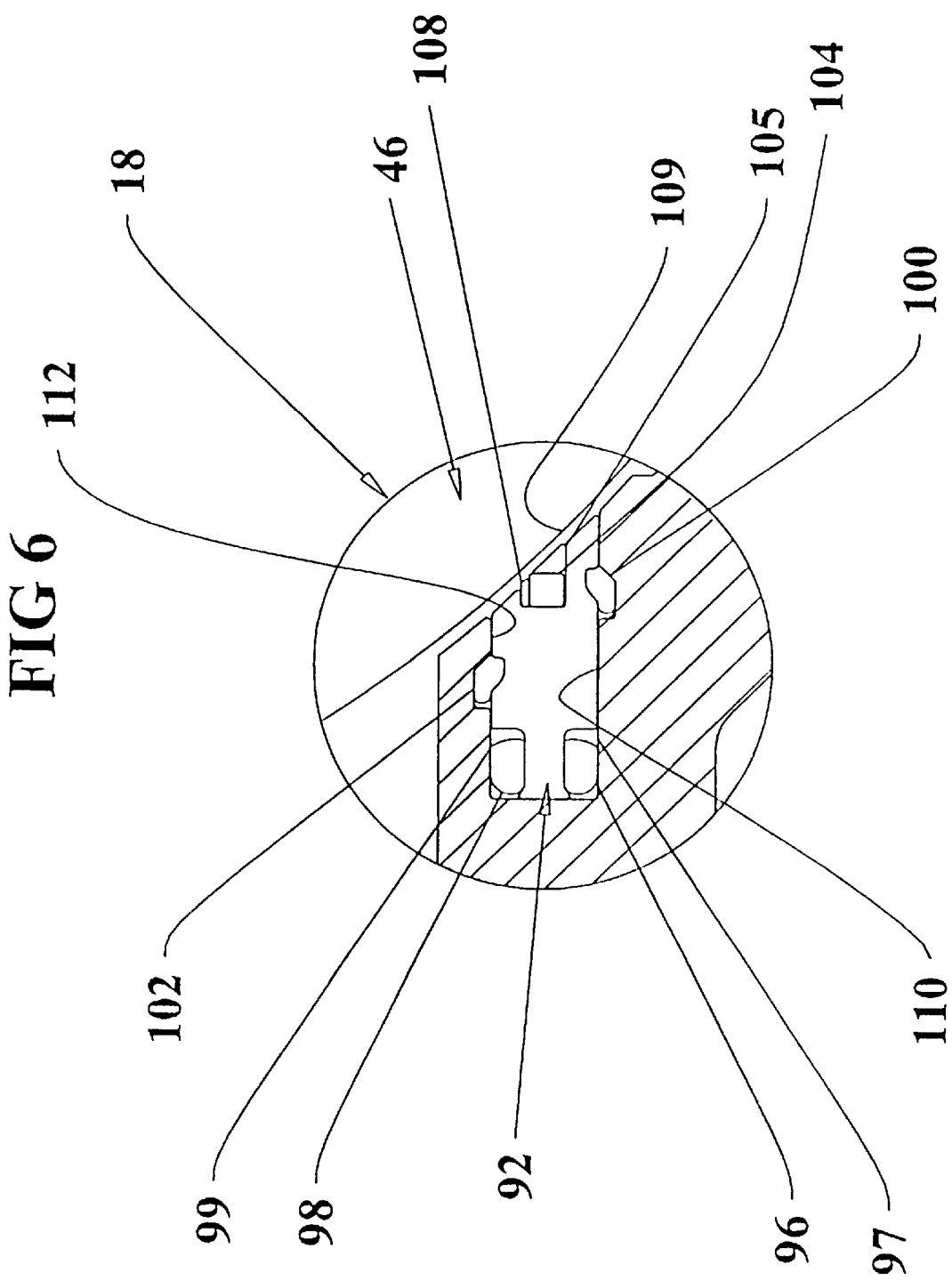
FIG. 6 is an enlarged sectional view of the annular seat but showing the annular seat in a retracted position out of sealing engagement with the adjacent ball with retraction members continuously urging the seat to a retracted position.

Referring to FIG. 6, seat member (92) is shown in the retracted position. Retraction devices (100 and 102) are shown in a less distended position. Sealing member (104) has moved away from the ball sealing surface (109) of ball (46) so that ball (46) may be turned freely.

Figure 7:
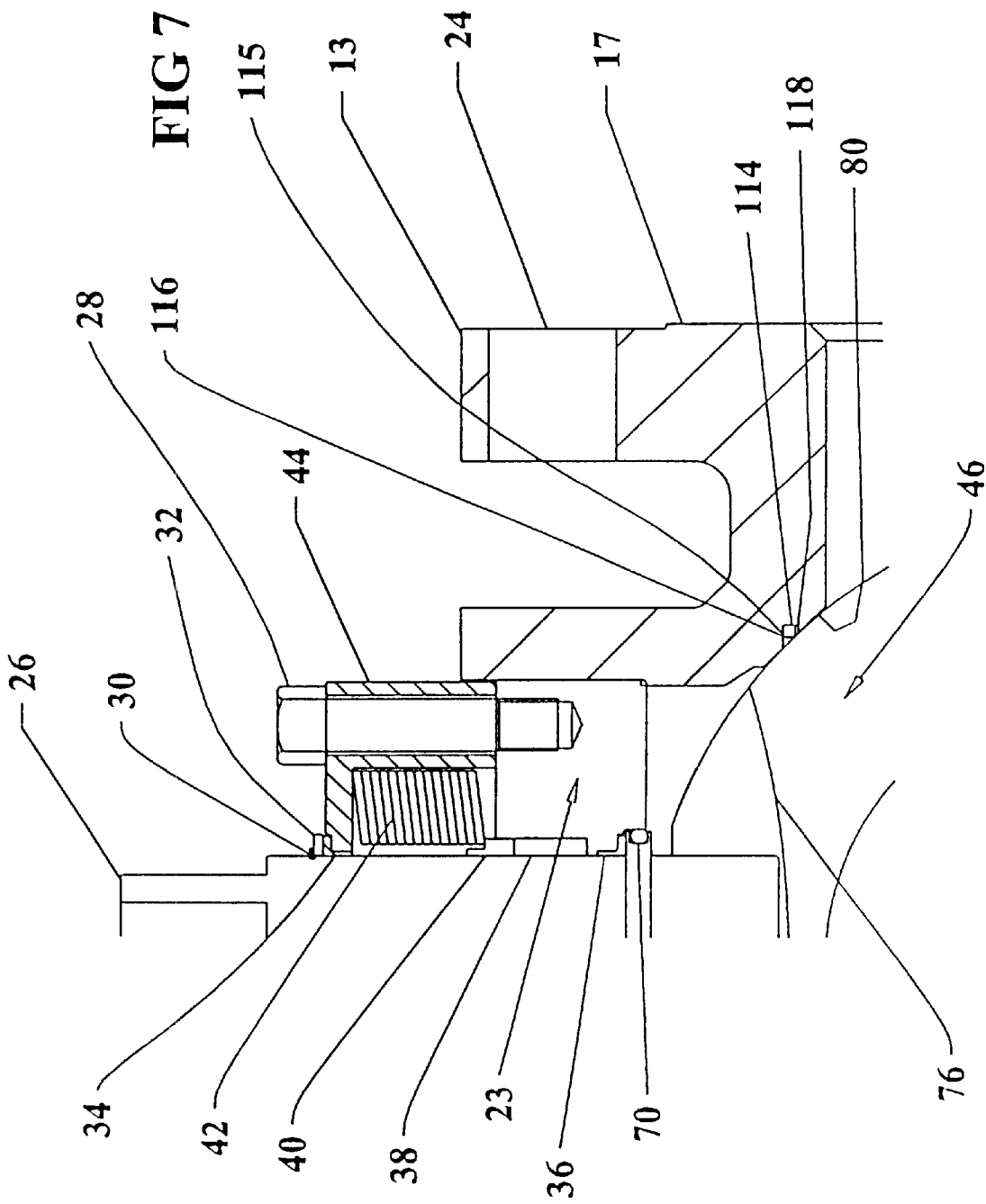
FIG. 7 is an enlarged sectional view of a portion of a ball valve adjacent the stem showing the bearings for the stem and also showing a downstream seat similar to the upstream seat.

FIG. 7 shows an alternate arrangement whereby a sealing member (114) with elastomeric injected materials (1 16 and 1 18) is also applied to surface (80) at the downstream end of valve (10). As shown, a recess (115) is machined into surface (80) of endpiece (13).

Figure 8:
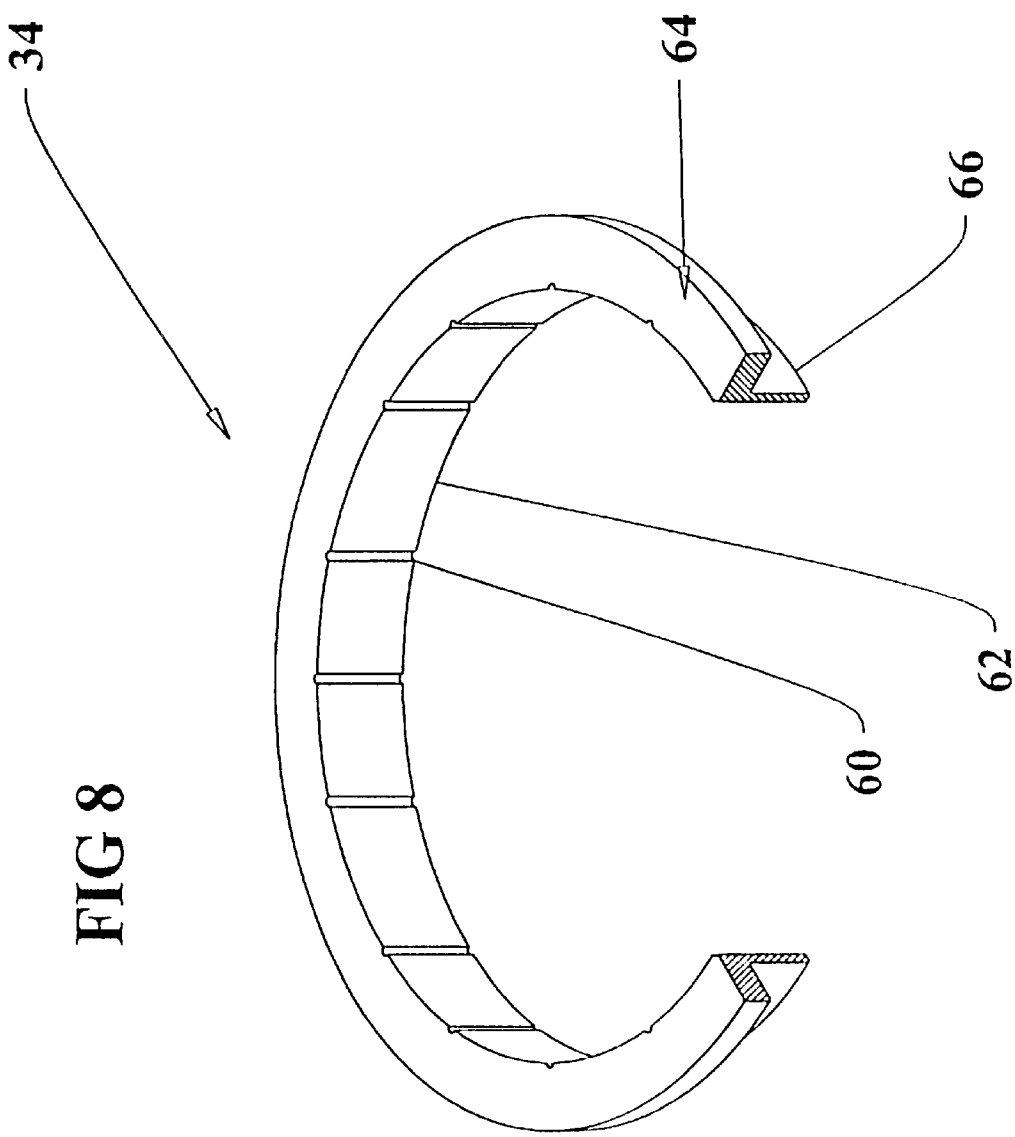
FIG. 8 is a perspective view of a bearing member with a portion cutaway.

FIG. 8 shows an enlarged view of bearing (34) or (36), which are identical. Bearing (34) consists of radially extending flange (64) and vertically extending leg (66). Surface (62) fits closely against stem (26). Grooves (60) are placed in the surface of bearing (34) or (36) to accumulate any debris that may be on the bearing surface. Grooves (60) also serve as a reservoir for lubrication.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a valve having a valve body for connection into a flow line, a conduit through said body, and a closure member mounted in said body which can selectively be moved to stop flow or to allow flow through said conduit, said valve having at least one seat which is actuated by external pressure to exert force against the closure member, the improvement comprising:
   a seat retractable mechanism fitting in an annular groove in said body adjacent said seat and having a retraction member in said groove for continuously urging the seat away from the sealing surface of said closure member.

2. In a valve as defined in claim 1, wherein said seat has inner and
   outer peripheral surfaces and an annular groove is positioned in each of said peripheral surfaces; and
   a retraction member is received within each of said annular grooves of said seat for urging said seat away from said closure member.

3. In a valve as defined in claim 1, wherein said seat has an annular
   groove therein; and
   said retraction member is received within said seat groove and urges said seat away from said closure member.

4. In a valve as defined in claim 3, wherein said annular groove in said
   body is positioned generally in opposed relation to said annular groove in said seat, said retraction member being received in both of said annular grooves.

5. A valve comprising:
   a valve body having a flow passage therein and a closure member mounted in said flow passage for movement between open and closed positions;
   an annular groove about said flow passage on an upstream side of said closure member;
   an annular upstream seat having inner and outer peripheral surfaces mounted within said annular groove and actuated into sealing engagement with said closure member by external pressure exerting force against said closure member;
   an annular recess in a sealing face of said seat;
   a sealing member fitting loosely in said recess for expansion or contraction radially;
   an annular groove in one of said peripheral surfaces; and
   a retraction member in said annular groove of said one peripheral surface for continuously urging said seat away from a sealing surface of said closure member.

6. A valve as defined in claim 5, further comprising:
   a ball forming said closure member;
   a stem connected to said ball; and
   upper and lower bearings on said body hardened to bear against said stem, said stem being hardened in the areas in which said bearings bear against said stem.

7. A valve comprising:
   a valve body having a flow passage therein and a closure member mounted in said flow passage for movement between open and closed positions;
   an annular groove about said flow passage on an upstream side of said closure member;
   an annular upstream seat having inner and outer peripheral surfaces mounted within said annular groove and actuated into sealing engagement with said closure member by external pressure exerting force against said closure member;
   an annular recess in a sealing face of said seat;

a sealing member fitting loosely in said recess for expansion or contraction radially;

an annular groove in one of said peripheral surfaces;

another annular groove in said body generally in opposed relation to said annular groove in said one peripheral surface; and an elastomeric retraction member mounted in said opposed annular grooves for continuously urging said seat away from a sealing surface of said closure member.

* * * * *